United States Patent [19]
Christian et al.

[11] Patent Number: 5,211,789
[45] Date of Patent: May 18, 1993

[54] OPTICAL CABLE COMPOSITE-MATERIAL BOBBIN WITH GROOVED BASE LAYER

[75] Inventors: John F. Christian; Daniel Schotter; Gregory LoStracco, all of Terrace, Ariz.

[73] Assignee: Hughes Aircraft Company, Los Angeles, Calif.

[21] Appl. No.: 551,220

[22] Filed: Jul. 11, 1990

[51] Int. Cl.$^5$ ............................................. B65H 81/00
[52] U.S. Cl. .................... 156/169; 242/119; 242/159; 156/172; 156/247
[58] Field of Search ............... 156/172, 247, 220, 169; 242/172, 173, 118.3, 118.32, 159; 428/36.91, 35.8, 172, 173, 349

[56] References Cited

U.S. PATENT DOCUMENTS

| | | | |
|---|---|---|---|
| 4,182,500 | 1/1980 | Schlicker | 242/118.7 |
| 4,696,438 | 9/1987 | Meyers | 242/118.41 |
| 4,743,940 | 5/1988 | Nagasaka et al. | 428/35.8 |
| 5,022,602 | 6/1991 | LoStracco | 242/159 |
| 5,029,960 | 7/1991 | Hulderman et al. | 242/159 |

FOREIGN PATENT DOCUMENTS 2182360  5/1987  United Kingdom .

OTHER PUBLICATIONS

Patent Abstracts of Japan-vol. 12, No. 195 (M-705) Jun. 7, 1988 and JP-A-63 001 681 (Furukawa Electric) Jan. 6, 1988 "Abstract".

*Primary Examiner*—Ellis P. Robinson
*Assistant Examiner*—Charles R. Nold
*Attorney, Agent, or Firm*—C. D. Brown; R. M. Heald; W. K. Denson Low

[57] ABSTRACT

A composite bobbin (10) for use in an optical fiber canister has a surface with a spirally groove base layer (38) in which the first layer of an optical cable (42) is wound. The base layer (38) is prepared by coating the external surface of a central portion (12) of the bobbin (10) with an adhesive layer (16) of a curable two-stage epoxy, winding a tensioned wire (22) in a spiral pattern along the length of the central portion (12), and heating the bobbin (10) to cure the epoxy. The proper combination of tension and curing cycle permits the grooves of the base layer (38) to be formed to a depth of about ⅓ of the diameter of the optical cable (42).

9 Claims, 2 Drawing Sheets

OPTICAL CABLE COMPOSITE-MATERIAL BOBBIN WITH GROOVED BASE LAYER

BACKGROUND OF THE INVENTION

This invention relates to the use of optical fibers, and, more particularly, to the construction of a bobbin upon which an optical fiber cable is wound.

Optical fibers are strands of glass fiber processed so that light beams transmitted therethrough are subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a highly plentiful substance, silicon dioxide.

Glass optical fibers are typically fabricated by preparing a preform of glasses of two different optical indices of refraction, one inside the other, and processing the preform to a fiber. The optical fiber is coated with a polymer layer termed a buffer to protect the glass from scratching or other damage, the resulting combination of an optical fiber within a buffer layer being termed an "optical cable". As an example of the dimensions, in a typical configuration the diameter of the glass optical fiber is about 125 micrometers, and the diameter of the fiber plus the polymer buffer (optical cable diameter) is about 250 micrometers (approximately 0.010 inches).

For such very fine fibers, the handling of the optical fiber and optical cable to avoid damage that might reduce its light transmission properties becomes an important consideration. The optical cable is typically wound onto a cylindrical or tapered bobbin made of aluminum or a composite material, with many turns adjacent to each other in a side-by-side fashion. To establish a base upon which the first layer of optical cable is wound, a base layer of steel wires of about the same diameter as the optical cable is first wound onto the bobbin. The optical cable is then wound onto that wire base. After one layer is complete, another layer of optical cable is wound on top of the first layer, and so on. The final assembly of the bobbin and the wound layers of optical cable is termed a canister, and the mass of wound optical cable is termed the fiber pack. When the optical cable is later to be used, the optical cable is paid out from the canister in a direction parallel to the axis of the bobbin and the canister, termed the payout axis.

It has been found by experience that, where the optical cable is to be paid out from the canister in a rapid fashion, as for example over a hundred meters per second, the turns of optical fiber must be held in place on the canister with an adhesive. The adhesive holds each turn of optical cable in place as adjacent turns and layers are initially wound onto the canister, and also as adjacent turns and layers are paid out. Without the use of an adhesive, payout of the optical cable may not be uniform and regular, leading to snarls or snags of the cable that damage it or cause it to break as it is paid out.

Although the optical cable may be wound onto the bobbin and wire base layer smoothly to form a uniform fiber pack, during prolonged storage and temperature changes the adhesively bound fiber pack can shift due to differences in the thermal expansion between the bobbin, the base layer, and the fiber pack. Instability can also result from other factors including the longitudinal forces resulting from the winding tension and the bobbin taper, which can cause the wires of the base layer to pop up. The resulting shifting of the fiber pack causes separations or slumps in the fiber pack, and the optical cable may not later pay out uniformly.

A similar problem had been encountered in prior practice wherein metallic conductor wires had been wound upon aluminum bobbins. The problem had been alleviated by forming a grooved surface upon the bobbin of the proper pitch so that the wire could be wound into the grooves. The grooves were formed by applying a curable adhesive to the surface of the bobbin, B-staging the adhesive, winding a wire around the bobbin in a spiral pattern under a very specific applied tension, and fully curing the adhesive with the wire in place. When the groove-forming wire was removed, the spiral pattern remained in the cured adhesive, and the conductor wire was wound onto the spiral. However, when this same approach was tried for the graphite-epoxy composite bobbin used with optical cables, it was not possible to form a regular spiral pattern with properly sized grooves.

There therefore exists a need for an approach for forming a fiber pack upon a composite bobbin, in a manner such that the fiber pack is resistant to separation-type failures during storage, which in turn can lead to an inability to achieve proper payout during use. The present invention fulfills this need, and further provides related advantages.

SUMMARY OF THE INVENTION

This invention provides an approach for forming a grooved baselayer on a bobbin made of a composite or other type of low coefficient of expansion material. An optical fiber pack is then wound on the grooved baselayer. The use of the grooved baselayer eliminates all payout failures caused by wire pop up. The approach is readily utilized in mass production of optical fiber canisters.

In accordance with the invention, a process for preparing a composite bobbin having a spirally grooved outer surface upon which an optical cable having a cable diameter can be wound comprises the steps of providing a bobbin having a body made of a composite material; applying a layer of a curable adhesive on the external surface of the body of the bobbin; partially curing the adhesive; winding a wire under tension spirally around the body of the bobbin over the layer of curable adhesive, the wire having a diameter larger than the optical cable diameter; heating the bobbin to soften and then fully cure the adhesive and thereafter cooling the bobbin; and removing the spirally wound wire to leave a spiral grooved pattern on the external surface of the bobbin, the combination of the curing cycle of the adhesive and the applied tension being sufficient to form a groove whose depth is about ⅓ of the diameter of the optical cable. The partial curing of the adhesive is termed "B-stage curing" or "B-staging" in the industry.

The invention also extends to the bobbin itself. In accordance with this aspect of the invention a bobbin comprises a body made of a nonmetallic composite material; a layer of a curable adhesive over a portion of the external surface of the body, the layer having a groove therein formed in a spiral pattern with longitudinally adjacent turns along the length of the body; and an optical cable wound upon the body of the bobbin so as to lie in the groove, the depth of the groove being about ⅓ that of the diameter of the optical cable.

It has been discovered that the wire must be wound with a relatively high tension, on the order of twice that in the prior practice. When the bobbin is heated to cure the adhesive, it expands radially by a substantial amount in the case of the prior aluminum bobbin, but very little in the case of the composite bobbin. The thermal expansion enlarges the bobbin and creates a higher stress in the wound wire than is achieved by the tension of the wire alone. When the bobbin is made of a material having a high coefficient of thermal expansion, such as aluminum, the expansion-induced stress adds significantly to the winding stress. When the bobbin is made of a material, such as a composite material, having a lower coefficient of thermal expansion, virtually all of the circumferential stress in the spirally wound wire must be supplied by the tension initially applied to the wire as it is wound.

Moreover, for the composite bobbin the adhesive is B-stage cured for less time so that it is not as hard and resistant to indentation by the spirally wound wire, as compared with prior practice. It is possible to achieve a spiral groove pattern with the depth of the groove about ⅓ of the diameter of the optical cable. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

According to the present approach, a formable base layer is provided upon the surface of a bobbin, the base layer is formed and cured with a spiral grooved pattern therein, and then the optical cable is wound onto the bobbin in the groove.

Figure 1:
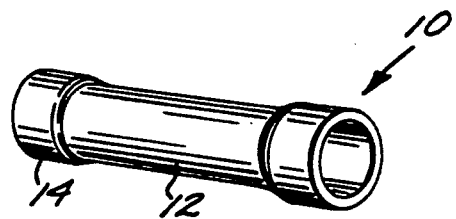
FIG. 1 is a perspective view of a bobbin upon which an optical cable is to be wound.

A bobbin 10 upon which an optical cable is wound is illustrated in FIG. 1. The bobbin 10 is generally a hollow cylinder or a slightly tapered cone, with a conical angle of less than about 5 degrees. The bobbin has a slightly radially recessed central portion 12, with radially enlarged ends 14. In the preferred embodiment, the bobbin 10 is 12.65 inches long and 5.6 inches in mean diameter. By comparison, a typical prior aluminum bobbin used to hold metallic guide wire has a length of 6.5 inches and a mean diameter of 1.0 inch.

The bobbin 10 is formed of a nonmetallic composite material, preferably graphite-epoxy composite material wound upon a mandrel and cured. Other similar materials of construction and fabrication techniques can also be used. An important characteristic of such composite materials is their low circumferential coefficient of thermal expansion. The composite bobbin circumferential coefficient of thermal expansion is approximately that of the longitudinal coefficient of thermal expansion of the optical cable, typically less than 1 part per million per degree Fahrenheit. (By comparison, the coefficient of thermal expansion of aluminum is about 13 parts per million per degree Fahrenheit.)

The present invention relates to the preparation of a base layer on the central portion 12 of the bobbin 10. After the base layer is prepared, an optical cable is wound in a spiral pattern upon the base layer. The preferred optical cable has a diameter of about 0.008–0.010 inches, most preferably about 0.010 inches. The dimensions stated herein are related to that most preferred value, but the invention is not so limited.

The first step in preparing the base layer is to deposit a layer 16 of a curable adhesive upon the central portion 12 of the bobbin 10. The adhesive is preferably furnished in the form of a three-part epoxy paint system, and is coated onto the central portion 12 to a thickness 18 of about 0.005 inches. The three parts are a curable component such as an epoxy, a curing agent that is mixed with the curable component, and a thinner used to thin the mixture of epoxy and curing agent to a consistency for application. Any such adhesive system is acceptable, as long as the proper B-staging and curing procedures are utilized. The preferred adhesive system meets Mil Standard MIL-P-47115, Type I. A most preferred adhesive system is the Skilcraft Pioneer Chemplate Missile Finish paint, and its associated catalyst and thinner.

The adhesive is preferably applied by spraying with a spray gun, and therefore must have a consistency suitable for spraying. After application, the epoxy layer 16 is partially cured to the "B-stage" condition by heating it from ambient temperature to 71° C. in 20 minutes, holding at 71° C. for 40 minutes, and then cooling to ambient temperature over a period of 30 minutes. This B-stage cured epoxy is firm to the touch, but is not fully cured. The adhesive thickness and B-stage time/temperature profile are such that after B-staging, the wire can be wound uniformly over the layer 16.

A single layer of steel wire is next wound onto the central portion 12 over the layer 16 of curable adhesive. The steel wire is preferably type 302 stainless steel wire. Its diameter is carefully selected to be from about 1 to about 3 percent greater than the nominal diameter of the optical cable that is later to be wound onto the bobbin. Thus, for example, if the optical cable is measured to be 250 micrometers in diameter, then the diameter of the steel wire is selected to be from about 252.5 to about 257.5 micrometers in diameter. The diameter of the wire must be greater than the nominal diameter of the optical cable to accommodate minor diameter variations in the optical cable diameter. If the steel wire is substantially larger than this range, however, the layer-to-layer crossovers may spiral excessively and cause problems in the winding of subsequent layers. If the steel wire is smaller than this range, variations in thickness of the buffer layer can cause popups that interfere with formation of a smooth, regular spiral in the wound optical cable.

Figure 3:
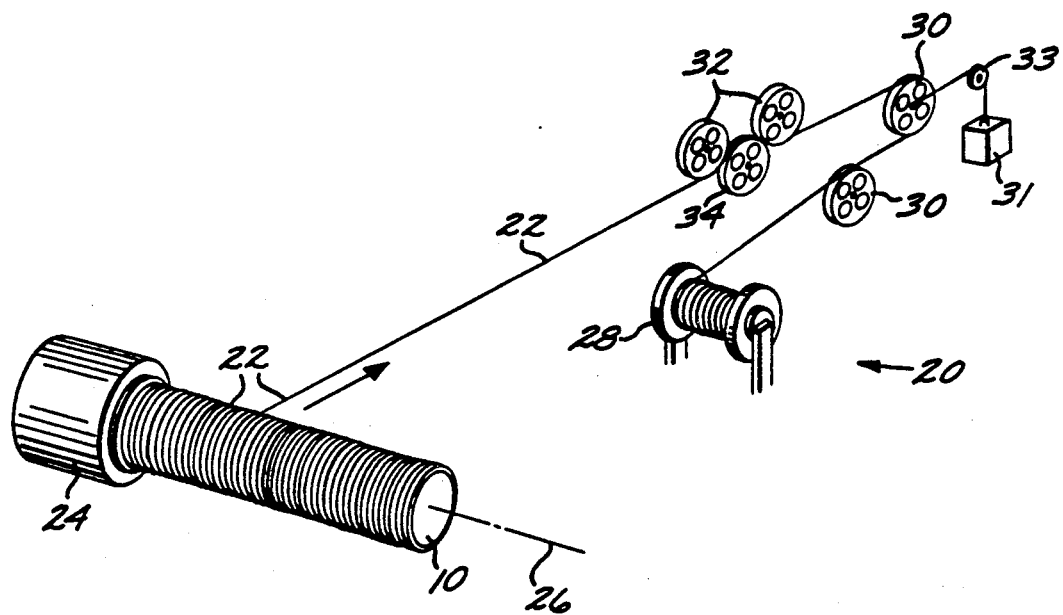
FIG. 3 is a perspective view of an apparatus for winding a steel wire layer over the adhesive layer.

An apparatus 20 for winding a single layer of a steel wire 22 is illustrated in FIG. 3. The bobbin 10 is grasped in a chuck 24 so that the bobbin 10 can be rotated about its cylindrical or conical axis of revolution 26 and moved parallel to the axis 26. The wire 22 is supplied from a reel 28, passed over a tension control pulley 30, and passed over a series of guide pulleys 32. The pulley 30 is supported so that it can move in the horizontal plane in the direction perpendicular to its axle. A tension sensing pulley 34 is pressed against the wire 22, and the deflection of the wire 22 is determined by the applied tension T. A weight 31 is suspended by a wire that passes over a pulley 33 and is connected to the axle of the pulley 30, to permit selection of the tension T in the wire 22. The greater the weight 31, the greater the tension T. The selection of the magnitude of the tension T will be discussed subsequently, but in the preferred case of a wire 22 of diameter about 0.010 inches, the tension T is about 5.5 pounds. The wire 22 is wound under tension onto the top of the adhesive layer 16 to form a layer 36, along the entire length of the central portion 12.

The bobbin 10, with the layer 36 of wire in place, is placed into an oven and heated to an elevated temperature for a period of time sufficient to first soften and then finally cure the adhesive layer 16 to its final state. In the preferred approach, the bobbin is heated to 71° C. in 15 minutes, held at 71° C. for 3½ hours, and cooled to ambient temperature in 30 minutes.

Figure 2:
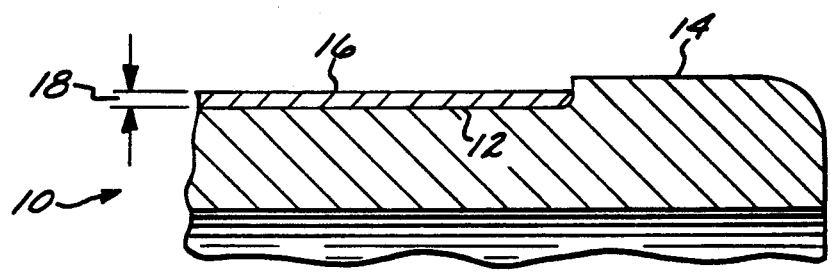
FIG. 2 is an enlarged side sectional view of a portion of the bobbin with an applied layer of a curable adhesive.
Figure 4:
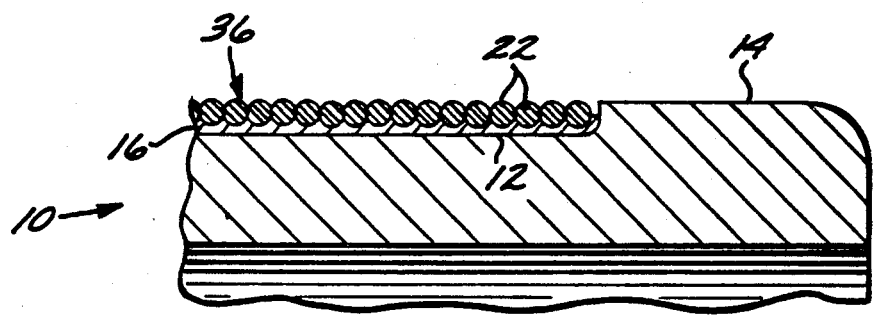
FIG. 4 is an enlarged side sectional view of a portion of the bobbin, with a wire in place to form the spiral winding.
Figure 5:
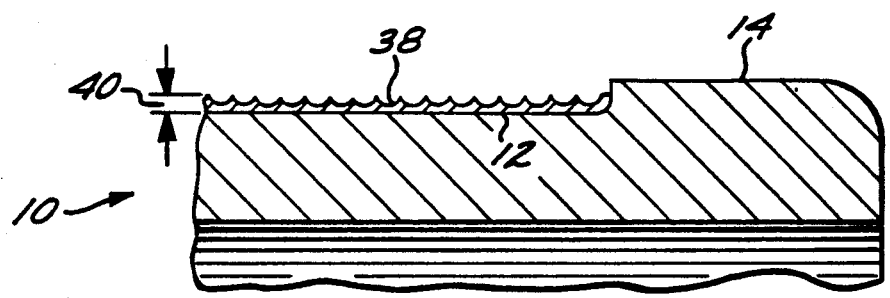
FIG. 5 is an enlarged side sectional view of a portion of the bobbin with the spirally wound wire removed and a base layer formed in the adhesive layer.

FIG. 4 is a side sectional view similar to that of FIG. 2, except with a single wire layer 36 wrapped in a spiral overlying the adhesive layer 16 by the process just discussed. The adhesive layer 16 has been deformed somewhat into a slightly grooved spiral pattern under the pressure of the wire 22 as it was wrapped under tension and heated. The bobbin 10 is then cooled to ambient temperature and the wire layer 36 removed, leaving a spirally grooved base layer 38 as shown in FIG. 5.

The combination of tension T and B-stage curing process are selected such that a groove depth 40 of the spirally grooved base layer 38 is about ⅛ of the diameter of the optical cable to be wound upon the base layer 38. If the groove depth is substantially less than this value, the optical fiber pack has an unacceptably great likelihood of slipping lengthwise along the bobbin with resulting slumps in the fiber pack. If the groove depth is substantially greater than this value, the high walls of the groove can interfere with the unwinding of the grooving wire after final cure.

The combination of wire tension T, B-stage curing, and thickness of layer 16 are critical to achieving this desired groove depth of about ⅛ of the diameter of the optical fiber. The tension applied is much larger than, and typically twice as large as, tensions applied for an aluminum bobbin of small diameter. The tension must be larger when a composite bobbin is used because the aluminum bobbin expands significantly during heating and curing of the adhesive layer, supplying a thermal expansion component to the tension of the steel wire. The adhesive layer is not B-staged for as long a time when the bobbin is made of composite material as when it is aluminum, to permit the adhesive to deform a greater amount prior to curing.

Figure 6:
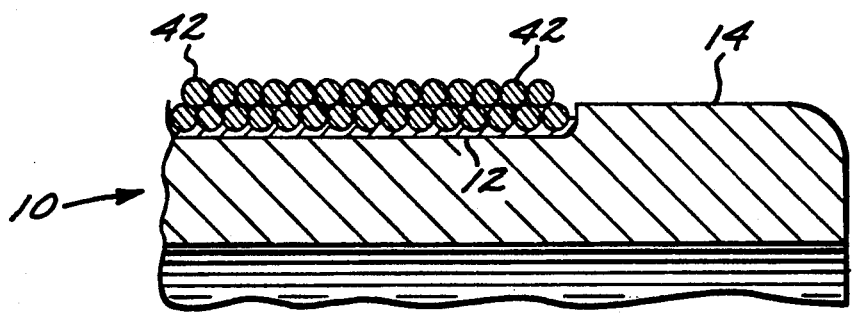
FIG. 6 is an enlarged side sectional view of a portion of the bobbin with an optical cable wound thereupon.

Multiple layers of an optical cable 42 are wound upon the base layer 38 as illustrated in FIG. 6. The first layer of the optical fiber 42 rests in the grooves of the base layer 38, and subsequent layers of the optical cable 42 rest upon the neighboring turns of the optical fiber in the preceding layer.

The present invention therefore provides a reproducible method for preparing a stable canister for the dispensing of an optical cable. Although particular embodiments of the invention have been described in detail for purposes of illustration, various modifications may be made without departing from the spirit and scope of the invention. Accordingly, the invention is not to be limited except as by the appended claims.

What is claimed is:

1. A process for preparing a nonmetallic composite bobbin having a spirally grooved outer surface upon which an optical cable having a cable diameter can be wound, comprising the steps of:
   providing a bobbin having a body made of a nonmetallic composite material;
   applying a layer of a curable adhesive on the external surface of the body of the bobbin;
   partially curing the adhesive;
   winding a wire under tension spirally around the body of the bobbin over the layer of curable adhesive, the wire having a diameter larger than the cable diameter;
   heating the bobbin to soften and then fully cure the adhesive and thereafter cooling the bobbin; and
   removing the spirally wound wire to leave a spiral grooved pattern on the external surface of the bobbin, the combination of the curing cycle of the adhesive and the applied tension being sufficient to form a groove whose depth is about ⅛ of the diameter of the optical cable.

2. The process of claim 1, wherein the wire is made of steel.

3. The process of claim 1, wherein the wire has a diameter of about 0.010 inches.

4. The process of claim 1, wherein the curable adhesive is an epoxy.

5. The process of claim 1, wherein the bobbin is a cylinder.

6. The process of claim 1, wherein the bobbin is a cone with a conical angle of less than about 5 degrees.

7. The process of claim 1, wherein the diameter of the wire is from about 1 percent to about 3 percent larger than the diameter of the optical cable.

8. The process of claim 1, wherein the body of the bobbin is made of graphite-epoxy composite material.

9. The process of claim 1, including the additional step, after the step of removing, of:
   winding an optical cable upon the body of the bobbin so as to lie in the groove.

* * * * *

UNITED STATES PATENT AND TRADEMARK OFFICE
CERTIFICATE OF CORRECTION

PATENT NO. : 5,211,789

DATED : May 18, 1993

INVENTOR(S) : John F. Christian et al.

It is certified that error appears in the above-identified patent and that said Letters Patent is hereby corrected as shown below:

TITLE PAGE

In "[75] Inventors:" after "all of" delete "Terrace" and insert therefor --Tucson--.

IN THE DRAWINGS

Amend Figure 3 by adding label 36 and its arrow to indicate the porton of wound wire 22, and add label 16 and its arrow to indicate the portion of base layer 38 which has not yet been covered by wire 22.

Signed and Sealed this

Third Day of January, 1995

*Attest:*

BRUCE LEHMAN

*Attesting Officer*     Commissioner of Patents and Trademarks